United States Patent [19]

Ardaud et al.

[11] Patent Number: 5,145,917

[45] Date of Patent: Sep. 8, 1992

[54] BORON/NITROGEN/SILICON PRECERAMIC POLYMERS AND BORON NITRIDE CERAMIC MATERIALS PRODUCED THEREFROM

[75] Inventors: Pierre Ardaud, Sainte-Foys-Les-Lyon; Gerard Mignani, Lyons, both of France

[73] Assignee: Rhone-Poulenc Chimie, Courbevoie, France

[21] Appl. No.: 565,455

[22] Filed: Aug. 10, 1990

[30] Foreign Application Priority Data

Aug. 10, 1989 [FR] France .................. 89 10939

[51] Int. Cl.$^5$ ............................................. C08F 283/00
[52] U.S. Cl. ...................... 525/474; 528/27; 528/33; 556/403
[58] Field of Search ................ 528/33, 27; 556/403; 525/474

[56] References Cited

U.S. PATENT DOCUMENTS

| | | | |
|---|---|---|---|
| 4,581,468 | 4/1986 | Paciorek et al. | 556/403 |
| 4,906,763 | 3/1990 | Paciorek et al. | 528/38 |
| 4,921,925 | 5/1990 | Niebylski | 528/38 |

FOREIGN PATENT DOCUMENTS 0310462  4/1989  European Pat. Off. .
2163761  3/1986  United Kingdom .

*Primary Examiner*—Melvyn I. Marquis
*Attorney, Agent, or Firm*—Burns, Doane, Swecker & Mathis

[57] ABSTRACT

Boron/nitrogen/silicon preceramic polymers are prepared by copolymerizing at least one trihaloborane with at least one disilazane and at least one B-trichloroborazine; the resulting polymers, advantageously in fibrous form, are then facilely crosslinked and pyrolyzed into boron nitride ceramic materials.

24 Claims, No Drawings

BORON/NITROGEN/SILICON PRECERAMIC POLYMERS AND BORON NITRIDE CERAMIC MATERIALS PRODUCED THEREFROM

BACKGROUND OF THE INVENTION

1. Field of the Invention

The present invention relates to novel organometallic preceramic polymers based on boron and nitrogen and to the pyrolysis of such preceramic polymers into ceramic materials at a temperature ranging from 1,000° to 2,000° C.

This invention especially relates to the conversion of such novel preceramic polymers into ceramic materials and shaped articles based on boron nitride, especially boron nitride in fibrous form.

2. Description of the Prior Art

Boron nitride is increasingly in demand in this art in light of its high thermal stability, its resistance to thermal shock, its great chemical inertness and its very good thermal conductivity. Furthermore, its low electrical conductivity makes it an insulator of choice.

Various processes are presently known to the art for the preparation of boron nitride.

One such process entails reacting boron trichloride with ammonia in the gaseous phase. A fine boron nitride powder is thus obtained, which can be sintered to produce solid shaped articles. However, the shaped articles thus produced exhibit a characteristic microporosity which can be highly detrimental for certain applications.

More recently, it was discovered that boron nitride could be prepared by pyrolysis of precursor polymers. One advantage of this "polymer" process primarily resides in the form of the final product, and, more particularly, enables the production, after pyrolysis thereof, of boron nitride-based fibers.

Thus, in U.S. Pat. No. 4,581,468 a preceramic organoboron polymer is described which is prepared by the interaction of ammonia (ammonolysis) with a trichlorotrialkylsilylborazole (a cyclic compound) and which, as indicated, after drawing and pyrolysis at 970° C., results in the production of boron nitride fibers.

However, the starting cyclic compound described in this patent is very difficult to prepare and is thus expensive. Consequently, it is not suitable for production on an industrial scale.

Published French Patent Application 2,620,455 described a preceramic polymer that is the product of reaction of a mixture of a trihaloborane and of a compound containing at least one boron atom to which two halogen atoms are directly bonded, with a compound containing at least one $NH_2$ group.

According to published French Application 2,620,443 this preceramic polymer can be pyrolyzed under ammonia to produce a ceramic material essentially based on boron nitride.

The article by K.A. Andrianov, *Bulletin of the Academy of Science, USSR*, 3, pp. 1,757–1,758 (1962) describes a process entailing introducing a trihaloborane of the formula $BX_3$ into a hexaalkyldisilazane of the formula $(R_3Si)_2NH$ to produce a trialkylsilylaminodihaloborane of the formula $R_3SiNHBX_2$; this reaction product is only a simple organoboron monomer and cannot be used, as such, as a suitable boron nitride precursor.

The reaction of a trihaloborane with a disilazane is also described very generally in EP-A-305,985, and the reaction product obtained is used as a precursor for making ceramized fibers under vacuum or under an inert atmosphere. The product obtained has a melting temperature which can be adjusted depending on the operating conditions of the reaction, but presents disadvantages when it is converted thermally, at temperatures up to 1,000° C., into ceramic materials, in that it comprises a high proportion of silicon and is poorly stable on prolonged exposure to the ambient air.

French Patent Applications 88/13 11, filed Oct. 6, 1988, and 89/05 177, filed Apr. 13, 1989, both assigned to the assignee hereof, describe that the reaction of a trihaloborane with a disilazane must be carried out under special conditions, to ensure that a polymer is produced which can be used as a ceramic precursor.

U.S. Pat. No. 4,707,556 describes the preparation of a ceramic polymer by reacting B-trichloroborazine with a disilazane. The precursor obtained is a solid which is soluble, in particular, in hexane and which presents the disadvantage of having a nonadjustable melting temperature.

SUMMARY OF THE INVENTION

A major object of the present invention is the provision of novel preceramic polymers based on boron, nitrogen and silicon, the physicochemical properties of which can be controlled.

Another object of the present invention is the provision of novel preceramic polymers based on boron, nitrogen and silicon that can be converted into a ceramic material of low silicon content, when pyrolyzed at 1,000.C.

Briefly, the present invention features the preparation of a preceramic polymer based on boron, nitrogen and silicon by interreacting a mixture of at least one trihaloborane A, of at least one disilazane B and of at least one B-trichloroborazine C.

DETAILED DESCRIPTION OF THE PREFERRED EMBODIMENTS OF THE INVENTION

More particularly according to the present invention, the starting trihaloborane A has the formula:

$$BX_3 \qquad (1)$$

in which X is a halogen atom selected from among chlorine, bromine, iodine and fluorine. X is preferably chlorine.

The starting disilazane B has the formula:

$$(R_3Si)_2NH \qquad (2)$$

in which the radicals R, which may be identical or different, are each a hydrogen atom or a hydrocarbon radical, with the proviso that not more than one hydrogen atom is directly bonded to a silicon atom.

The preferred hydrocarbon radicals R include the alkyl, cycloalkyl, alkenyl, aryl, alkylaryl and arylalkyl radicals having not more than 10 carbon atoms.

Exemplary of such preferred alkyl radicals are methyl, ethyl, propyl, butyl, pentyl, hexyl, heptyl and octyl radicals. Exemplary of the preferred cycloalkyl radicals are cyclopentyl, cyclohexyl and cycloheptyl radicals. An exemplary alkenyl radical is the vinyl radical. Exemplary such aryl radicals are the phenyl and naphthyl radicals. Exemplary such alkylaryl radicals are the tolyl and xylyl radicals, and exemplary such arylalkyl radicals are the benzyl and phenylethyl radicals.

Particular disilazane compounds, whether used alone or in admixture, are the following:

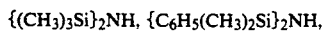

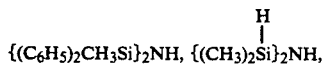

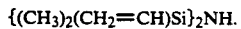

In a preferred embodiment of the invention, the hexaalkyldisilazanes are employed by themselves or mixed with tetraalkyldialkenyldisilazanes.

The starting B-trichloroborazine C has the formula:

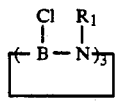

in which $R_1$ is a hydrogen atom or an alkyl radical having from 1 to 6 carbon atoms.

The starting compounds A, B and C are preferably used in the following molar ratios:

$0.1 < A/C < 10$, preferably $0.5 < A/C < 2$ $1 < B/(A+C) < 12$, preferably $5 < B/(A+C) < 8$ The reaction can be carried out at atmospheric pressure, although lower or higher pressures are also with the scope of the invention.

The reaction between A, B and C can be carried out in bulk or, preferably, in solution in an organic solvent of aprotic type (hexane, pentane, toluene, chlorobenzene and the like) and under anhydrous conditions.

The temperature of the reaction mixture is not a critical parameter and can range from $-50°$ C. to the reflux temperature of the solvent employed.

To form a polymer having a better structure and thus to increase the yields during the subsequent pyrolysis, it may also be advantageous to heat the reaction mixture, for example by increasing its temperature to the reflux temperature of the solvent, this being carried out over a period of time which may range from a few minutes to several hours. However, most of the time this heat treatment is not necessary.

At the end of this reaction stage, the polymer is separated from the reaction medium by any known means, for example by filtration under an inert atmosphere or else by extraction and phase separation, especially by means of liquid ammonia.

The polymer thus recovered, after optional removal of the solvent (distillation or other), followed by drying, then constitutes the polymeric precursor which can be pyrolyzed.

Optionally, the polymer thus obtained can be treated in a subsequent stage with a view towards further reducing its residual chlorine content. Such treatment comprises contacting said polymer, in bulk or preferably in an anhydrous organic solvent medium (hexane, pentane, toluene, etc.) with a compound containing at least one $NH_2$ group and referred to hereinafter as an aminolysis agent.

Exemplary such aminolysis agents include ammonia, primary amines, diamines (hydrazine, alkylhydrazine, hydrazide, alkylenediamine, etc.), amides, silylamines, and the like.

The compounds preferably used are those having the following formula:

$R^2$ is a hydrogen atom, or a hydrocarbon or silyl radical. The following are particularly representative:

(i) ammonia ($R^2$ = hydrogen atom);

(ii) primary organoamines ($R^2$ = alkyl, cycloalkyl, aryl, alkylaryl or arylalkyl radical), such as, for example, methylamine, ethylamine, propylamine, butylamine, pentylamine, hexylamine, heptylamine and octylamine, cyclopropylamine, phenylamine, and the like;

(iii) silylamines, and more particularly triorganosilylamines such as (triethylsilyl)amine, or hydrogenoorganosilylamines such as (hydrogenodimethylsilyl)amine.

The preferred aminolysis agents are the primary alkylamines and ammonia.

In a more preferred embodiment of the invention, ammonia is used.

The starting compounds A, B and C may be introduced into the reactor in any order. It is recommended, however, to first introduce C, preferably in solution in an organic solvent, at a temperature preferably below $-20°$ C. The compound A is then introduced by bubbling (if it is a gas).

While the mixture of A and C is maintained at a temperature preferably below $-20°$ C., the compound B is slowly introduced. The addition time preferably ranges from 10 minutes to 5 hours. At the end of addition of B, the reaction mixture is permitted to return to room temperature (20° C.) and the polymer obtained is separated off by removing the solvent.

The polymers based on boron, nitrogen and silicon according to the invention have a number-average molecular weight ($\overline{M}n$) ranging from 400 to 10,000, and preferably from 600 to 5,000.

Furthermore, they have a weight-average molecular weight ($\overline{M}w$) ranging from 600 to 100,000 and preferably from 700 to 10,000. Their polydispersity ratio (Pr) generally ranges from 1.1 to 3.

Depending on the reaction conditions of the process described above, at room temperature the polymers according to the invention can be in a form ranging from an oil of low or high viscosity to the solid state.

The polymers according to the invention are additionally fusible and soluble in the majority of common organic solvents (hexane, toluene, etc.), it being possible to control their melting temperature by varying the reaction conditions under which the process is conducted; this can be highly advantageous for the shaping thereof.

Spectroscopic analyses evidence that the polymers according to the invention are indeed terpolymers and not a mixture of two polymers resulting, on the one hand, from the reaction of A with B and, on the other hand, from the reaction of B with C.

After optional melting if it is in the solid state at room temperature, the polymers according to the invention can be spun directly into filaments whose diameter may, for example, range from 10 to 40 $\mu$m.

The filament obtained is then rendered infusible before being pyrolyzed at a temperature ranging from 300° to 1,800° C. under vacuum, in an inert atmosphere (nitrogen, argon) or under ammonia to convert it into boron nitride.

The filament is rendered infusible, especially by heat treatment, by the action of water, of ammonia, of UV radiation, of an electron beam or using a combination of these means.

The ceramic fibers thus obtained can then be used, e.g., as reinforcing materials for composites of the ceramic/ceramic, ceramic/metal or ceramic/plastic type.

In the most general case (powders being obtained), the polymer is pyrolyzed directly under the same conditions as in the case of fibers, until the polymer is converted completely into a boron nitride-based ceramic.

The ceramic materials thus obtained have a low silicon content, ranging from approximately 0.1% to 3% by weight.

In order to further illustrate the present invention and the advantages thereof, the following specific examples are given, it being understood that same are intended only as illustrative and in nowise limitative.

In said examples to follow:
$\overline{M}n$ is the number-average molecular weight;
$\overline{M}w$ is the weight-average molecular weight;
Pr is the polydispersity ratio;
TGA is thermogravimetric analysis.

The parts and percentages are given by weight, unless otherwise indicated.

EXAMPLE 1

$BCl_3 + \{BCl-NH\}_3 + HMDZ$ 700 ml of dry toluene and 20.3 grams of B-trichloroborazine (0.11 moles) were charged into a 1 liter reactor under nitrogen.

After cooling to −30° C., 12.9 grams (0.11 moles) of boron trichloride were introduced by bubbling it into the reactor.

106.5 grams of hexamethyldisilazane (0.66 moles) were then introduced over 50 minutes, the temperature of the reaction mixture being maintained at about −30° C. At the end of the addition, the mixture was stirred for 1 hour while the temperature was permitted to return to ambient.

After filtration under nitrogen, the clear and colorless solution thus obtained was evaporated down to produce 36 grams of polymer which was in the form of a white The characteristics of the polymer obtained were the following:
(a) product very soluble in toluene,
(b) softening temperature =95° C.,
(c) melting of the product at 110° C. with the formation of filaments on drawing,
(d) $\overline{M}n = 1,120$,
(e) $\overline{M}w = 3,880$,
(f) Pr = 345
(g) TGA = 32.7% residue at 850° C. under helium.

A sample of this product was pyrolyzed under ammonia up to 1,000° C. to provide a very hard and sintered white ceramic, with a preponderance of BN.

IR and Raman analyses on the sample pyrolyzed at 1,000° C. evidenced that the ceramic produced was essentially completely boron nitride BN,
(i) Pyrolysis yield = 28.94%
(ii) Residual Cl content <0.2%,
(iii) Si content = 1.4%.

COMPARATIVE EXAMPLE 2

$BCl_3 + HMDZ$ 630 ml of dry toluene were charged into a 1 liter reactor under nitrogen followed, after cooling to −30° C., by 26 grams (0.22 moles) of boron trichloride introduced by bubbling it into the reactor.

107 grams of hexamethyldisilazane (0.66 moles) were then introduced over 65 minutes, the temperature of the reaction mixture being maintained at about −25° C. At the end of the addition, the mixture was stirred for 1 hour, 30 minutes, while the temperature was permitted to return to ambient.

After filtration under nitrogen, the solution thus obtained was evaporated down to produce 23 grams of slightly white, highly fluid oil.

The characteristics of the polymer obtained were as follows:
TGA = 17.3% residue at 850° C. under helium.

A sample of this product was pyrolyzed under ammonia at up to 1,000° C. to provide a ceramic whose Si content was 5.5%.

COMPARATIVE EXAMPLE 3

$(BCl-NH)_3 + HMDZ$ 620 ml of dry toluene and 41 grams of B-trichloroborazine (0.22 moles) were charged into a 1-liter reactor under nitrogen. After cooling to −25° C., 107.7 grams of hexamethyldisilazane (0.67 moles) were then introduced over 20 minutes, the temperature of the reaction mixture being maintained at about −25° C. At the end of the addition, the mixture was stirred for 2 hours while the temperature was permitted to return to ambient.

After filtration under nitrogen, the clear and colorless solution thus obtained was evaporated down to produce 45 grams of polymer which was in the form of white foam.

The characteristics of the polymer obtained were the following:
(a) softening temperature = 200° C.,
(b) melting of the product at 240° C. to give a soft paste,
(c) TGA = 43.7% residue at 850° C. under helium.

A sample of this product was pyrolyzed under ammonia at up to 1,000° C. to provide a ceramic with a preponderance of BN:
(i) Pyrolysis yield = 37.5%,
(ii) Si content = 3.4%.

EXAMPLE 4

The following materials were charged into a dried 1-liter reactor under nitrogen:
(i) 10.5 grams of the polymer produced in Example 2,
(ii) 10.8 grams of the polymer produced in Example 3, and 100 ml of toluene were then added to homogenize the mixture. After the products had dissolved completely, the solvent was evaporated off to produce 19.7 grams of a very heterogeneous sticky solid (losses of 1.58 g during the evaporation).

TGA of the mixture thus obtained = 38.5% at 850° C. under helium.

EXAMPLE 5

300 ml of dry toluene and 29.9 grams of B-trichloroborazine (0.162 moles) were charged into a dried 0.5-liter reactor under nitrogen, together with 6.3 grams of trichloroborane (0.054 moles).

104.6 g of hexamethyldisilazane (0.648 moles) were introduced over 1 hour while the temperature was maintained at −20° C. in the reaction mixture.

At the end of the reaction, the solution was filtered and was then evaporated down to produce 32.4 g of white solid.

This product was pyrolyzed under ammonia at up to 1,000° C. to produce a ceramic with a preponderance of BN:
(i) Pyrolysis yield=37.62%,
(ii) Si content=2.68%.

EXAMPLE 6

The operating procedure was identical with that of Example 5; the following materials were introduced:
(i) 9.75 g (0.053 moles) of B-trichloroborazine,
(ii) 18.6 g (0.159 moles) of trichloroborane,
(iii) 102.6 g (0.636 moles) of hexamethyldisilazane,
(iv) 300 ml of dry toluene.

24.7 g of a brittle resin were obtained, whose softening temperature was 200° C.

The operating procedure of the pyrolysis was identical with that of Example 5.
(i) Pyrolysis yield=36.29%,
(ii) Si content=0.80%.

EXAMPLE 7

The operating procedure was identical with that of Example 5; the following materials were introduced into a 2-liter reactor:
(i) 11 g (0.094 moles) of trichloroborane,
(ii) 17.3 g (0.094 moles) of B-trichloroborazine,
(iii) 91 g (0.564 moles) of hexamethyldisilazane,
(iv) 800 ml of dry toluene.

31.2 g of a solid product were obtained, whose softening temperature was 95° C.

The operating procedure of the pyrolysis was identical with that of Example 5.
(i) Pyrolysis yield=35.19%,
(ii) Si content=1.45%.

EXAMPLE 8

The operating procedure was identical with that of Example 5; the following materials were introduced into a 2-liter reactor:
(i) 41 g (0.35 moles) of trichloroborane,
(ii) 7.1 g (0.039 moles) of B-trichloroborazine,
(iii) 188.4 g (1.17 moles) of hexamethyldisilazane,
(iv) 630 ml of dry toluene.

41 g of a resinous product were obtained.

The operating procedure of the pyrolysis was identical with that of Example 5.
(i) Pyrolysis yield=25.66%,
(ii) Si content=0.43%.

EXAMPLE 9

Synthesis of the Polymer

The operating procedure was identical with that of Example 5; the following materials were introduced into a 0.5-liter reactor:
(i) 36.8 g (0.314 moles) of trichloroborane,
(ii) 14.46 g (0.078 moles) of B-trichloroborazine,
(iii) 189.8 g (1.18 moles) of hexamethyldisilazane,
(iv) 400 ml of dry toluene.

45.5 g of a viscous oil were obtained.

This product was subjected to a heat treatment under vacuum to improve its physicochemical properties; the temperature of the treatment was 200° C., its duration was 4 hours, under a pressure of 0.5 kPa.

A solid product was obtained having a softening temperature of 115° C. and a melting temperature of 150° C., which permitted it to be spun.

Spinning and Pyrolysis of the Polymer

The product obtained was extrusion-spun in the form of fibers of 7 filaments from 25 to 35 μm in diameter and the fiber was then reeled up.

These fibers were rendered infusible by a treatment with ammonia.

These fibers were then pyrolyzed under ammonia at 1,000° C. to produce fibers with 7 filaments ranging from 7.5 to 12 μm in diameter essentially constituted of BN.

Fiber pyrolysis yield≃32%.

EXAMPLE 10

A solution of 15.7 g (0.85 moles) of B-trichloroborazine in 758.9 g of dry toluene was charged into a jacketed 3-liter reactor.

This was cooled to −30° C. and 10.03 g (0.085 moles) of trichloroborane were then introduced.

A mixture of:
(i) 65.85 g (0.408 moles) of hexamethyldisilazane,
(ii) 18.91 g (0.102 moles) of tetramethyldivinyl disilazane, was then introduced dropwise over 1 hour, while the temperature was maintained at −25° C. to −23° C.

The mixture was then maintained for 1 hour at room temperature and was then filtered. A clear solution was recovered. After evaporation of the solvent under vacuum, the product was maintained at 60° C. for 1 hour under a pressure of 0.67 kPa. 23 g of a white powder were then recovered:
(a) Softening temperature : 110° C.,
(b) Melting temperature : 180° C.

The product was pyrolyzed under ammonia according to the following conditions:
(i) from 25° C. to 400° C. : 1° C./min (plateau of 1 hour),
(ii) from 400° C. to 1,000° C. : 3° C./min (plateau of 3 hours).

A completely white ceramic was obtained in a 37.07% yield.

IR and Raman analyses and microanalyses confirmed the formation of a ceramic predominantly composed of boron nitride.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organometallic preceramic boron/nitrogen/silicon polymer comprising the copolymerizate of at least one trihaloborane A with at least one disilazane B and at least one B-trichloroborazine C.

2. The preceramic polymer as defined by claim 1, said at least one trihaloborane A having the formula:

$BX_3$ in which X is a halogen atom, said at least one disilazane B having the formula:

$(R_3Si)_2NH$ in which the radicals R, which may be identical or different, are each a hydrogen atom or a hydrocarbon radical, with the proviso that not more than one hydrogen atom is directly bonded to a silicon atom, and said at least one B-trichloroborazine C has the formula:

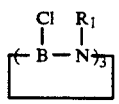

in which $R_1$ is a hydrogen atom or an alkyl radical having from 1 to 6 carbon atoms.

3. The preceramic polymer as defined by claim 2, wherein said at least one trihaloborane A, X is chloro.

4. The preceramic polymer as defined by claim 2, further reacted with an agent effective for aminolysis.

5. The preceramic polymer as defined by claim 4, said agent effective for aminolysis comprising a primary amine or an amide.

6. The preceramic polymer as defined by claim 1, having a number-average molecular weight ranging from 400 to 10,000.

7. The preceramic polymer as defined by claim 6, having a number-average molecular weight ranging from 600 to 5,000.

8. The preceramic polymer as defined by claim 6, having a weight-average molecular weight ranging from 600 to 100,000.

9. The preceramic polymer as defined by claim 8, having a weight-average molecular weight ranging from 700 to 10,000.

10. The preceramic polymer as defined by claim 8, having a polydispersity ratio ranging from 1.1 to 3.

11. The preceramic polymer as defined by claim 1, comprising an oil.

12. The preceramic polymer as defined by claim 1, in solid state.

13. The preceramic polymer as defined by claim 1, in infusible crosslinked state.

14. A process for the preparation of the preceramic polymer as defined by claim 1, comprising copolymerizing said at least one trihaloborane A with said at least one disilazane B and with said at least one B-trichloroborazine C.

15. The process as defined by claim 14, wherein the monomers A, B and C. are employed in the following molar ratios:

$$0.1 < A/C < 10$$

and $$1 < B/(A+C) < 12.$$

16. The process as defined by claim 15, wherein the monomers A, B and C. are employed in the following molar ratios:

$$0.5 < A/C < 2$$

and $$5 < B/(A+C) < 8.$$

17. The process as defined by claim 14, carried out in an aprotic organic solvent.

18. The process as defined by claim 14, said at least one disilazane B comprising a mixture of a hexaalkyldisilazane and a tetraalkyldisilazane.

19. The process as defined by claim 14, said at least one trihaloborane A comprising $BCl_3$, said at least one disilazane B comprising hexamethyldisilazane and said at least one B-trichloroborazine C. having the formula:

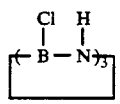

20. The process as defined by claim 14, further comprising reacting the preceramic polymer thus produced with an agent effective for aminolysis.

21. The preceramic polymer as defined by claim 1, in fibrous form.

22. The preceramic polymer as defined by claim 4, said agent effective for aminolysis comprising ammonia.

23. The preceramic polymer as defined by claim 4, said agent effective for aminolysis comprising a diamine.

24. The preceramic polymer as defined by claim 4, said agent effective for aminolysis comprising a silylamine.

* * * * *